Sept. 22, 1931.  T. DANTZIG ET AL  1,824,395
APPARATUS FOR THE MEASUREMENT OF STIFFNESS OF FLEXIBLE MATERIALS
Filed Aug. 9, 1928
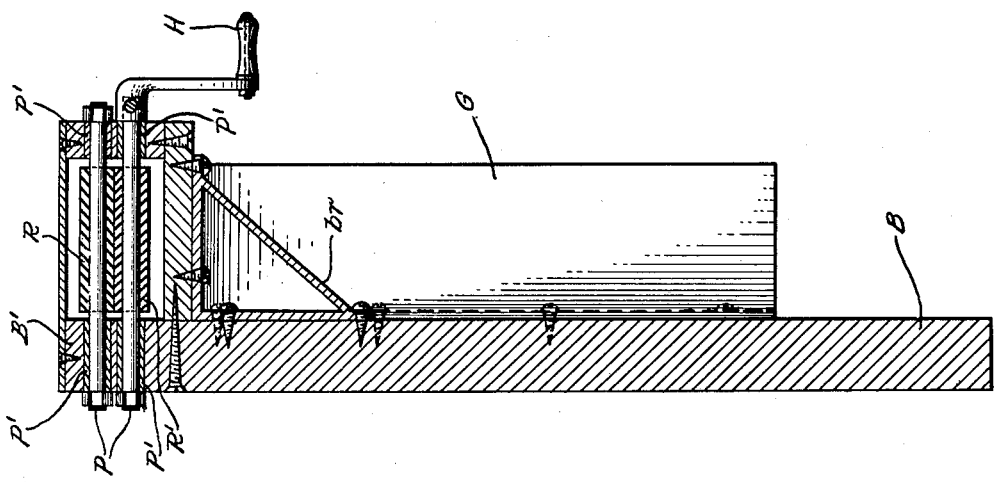
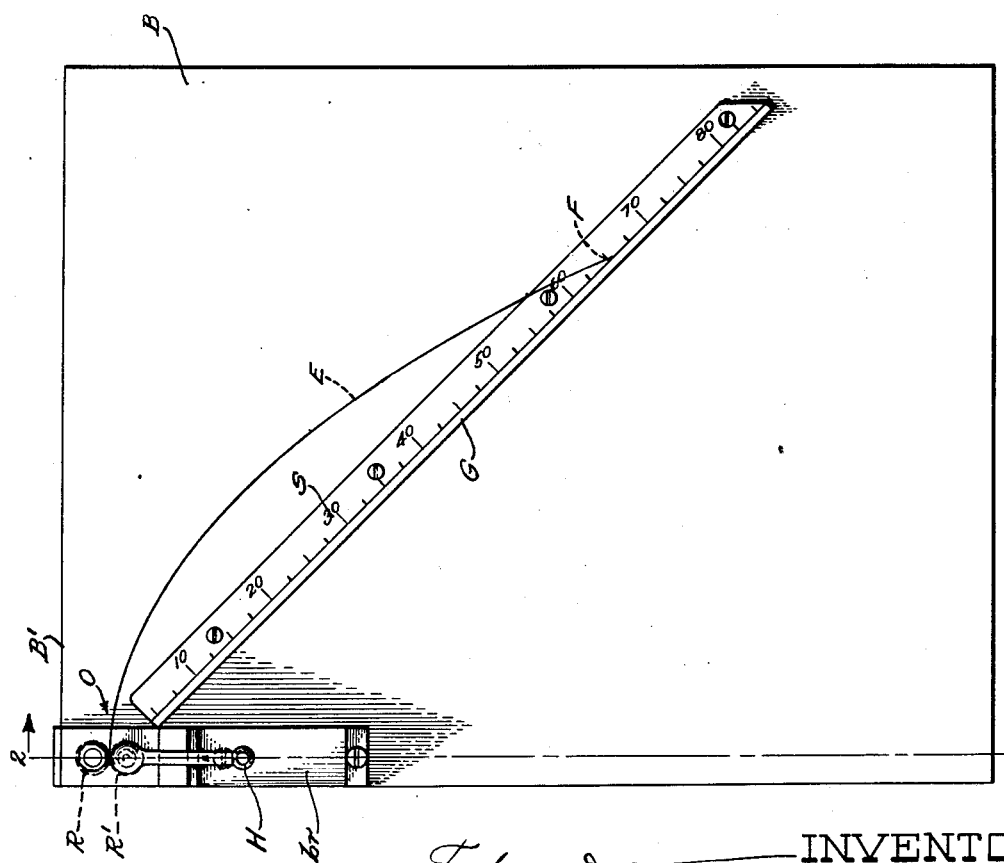
INVENTORS
Tobias Dantzig
Esther Gillerson
Attorneys Patented Sept. 22, 1931

1,824,395

UNITED STATES PATENT OFFICE

TOBIAS DANTZIG AND ESTHER C. PETERSON, OF WASHINGTON, DISTRICT OF COLUMBIA, DEDICATED TO THE GOVERNMENT AND THE PEOPLE OF THE UNITED STATES OF AMERICA

APPARATUS FOR THE MEASUREMENT OF STIFFNESS OF FLEXIBLE MATERIALS

Application filed August 9, 1928. Serial No. 298,577.

(GRANTED UNDER THE ACT OF MARCH 3, 1883, AS AMENDED APRIL 30, 1928; 370 O. G. 757)

This application is made under the act approved April 30, 1928, and the invention herein described, if patented, may be manufactured and used by or for the Government for governmental purposes without payment to us of any royalty thereon.

In the accompanying drawings Fig. 1 is a view in elevation of the apparatus we employ in our measurements; and Fig. 2 is a vertical section of the apparatus on the line 2—2 of Fig. 1.

Referring to the drawings, it will be seen that B represents a vertical board, near the upper edge $B^1$ of which are mounted flexible rollers R and $R^1$. The Board B also supports an inclined guide G the longitudinal axis of which passes through the line of contact of the rollers R and $R^1$.

In operating the device, test material is cut into a strip E of convenient width and passed between the rollers R and $R^1$, the free end F of the strip resting on the guide G. The lower roller $R^1$ is then turned by means of the handle H until the free end of the strip barely touches the guide G. The guide is provided with a scale S the origin of which is at the line of contact O. The stiffness number hereinafter explained is read off the scale at the point where the free end of the strip touches the guide.

The rubber rollers R and $R^1$ are mounted on pins P. Each pin turns in two sleeves $P^1$ which are mounted at one end in the vertical board B and at the other in the wall of a shelf which is fastened at one corner of the board by means of a bracket $br$. The guide G has an angle cross section, its protruding part serving as a guide for the material.

The construction of this apparatus is based on the following principle: When a flexible strip is clamped at one end and freely suspended, the strip assumes a certain curved position, the form of which depends upon the elastic modulus of the material, the thickness and width of the material and its total length from its clamped to its free end. For a given material, the thickness and weight remain sensibly constant; the curve, therefore, depends merely on the length of the strip and on the elastic modulus. For purposes of measurement, we define the stiffness of the material as a number proportional to the cube root of the elastic modulus.

A mathematical analysis of the problem from the standpoint of the theory of elasticity shows that the rectilinear distance between the free end and the clamped end can with excellent approximation be taken as proportional to the number defined as stiffness in the preceding paragraph. For this reason if a uniform scale of convenient unit has been marked on the board with the zero point at the point of contact of the two rollers between which the material is clamped the position of the free end of the strip would measure the stiffness as defined.

Two methods may be followed in selecting the unit. We can be guided in our selection by a more or less arbitrary judgment as to what numbers would be most adaptable to the trade. We also may calibrate our scale by using standard metal foil of variable thickness. If the second method is adopted and the stiffness of a material is found to be 7, the interpretation of the reading would be that our material is as stiff as a certain metal foil .007 inches thick.

We claim:

An apparatus for measuring the stiffness of flexible material, comprising means for clamping said material at one end, a downwardly inclined guide for said material at its other end, said guide having a scale provided with calibrations having their origin at the clamp end of said flexible material, and means for supporting said clamping means and said guide.

TOBIAS DANTZIG.
ESTHER C. PETERSON.